United States Patent [19]

Miller Robert J. et al.

[11] Patent Number: 5,047,084

[45] Date of Patent: Sep. 10, 1991

[54] MICROEMULSION INK JET INK COMPOSITION

[75] Inventors: Miller Robert J., Burlingame; Young S. You, Los Altos, both of Calif.

[73] Assignee: Hewlett-Packard Company, Palo Alto, Calif.

[21] Appl. No.: 468,551

[22] Filed: Jan. 23, 1990

[51] Int. Cl.$^5$ .................... C09D 11/00; C09D 11/06
[52] U.S. Cl. ........................................ 106/27; 106/22
[58] Field of Search .................................. 106/22, 27

[56] References Cited

U.S. PATENT DOCUMENTS

| 3,946,138 | 3/1976 | Jones | 106/22 |
| 4,409,039 | 10/1983 | Lepesant et al. | 106/22 |
| 4,692,188 | 9/1987 | Ober et al. | 106/23 |
| 4,781,985 | 11/1988 | Desjarlasio | 428/421 |
| 4,797,692 | 1/1989 | Ims | 106/20 |
| 4,889,560 | 12/1989 | Jaeger et al. | 107/27 |

Primary Examiner—William R. Dixon, Jr.
Assistant Examiner—Tim S. Saunders

[57] ABSTRACT

An ink jet ink in the form of a microemulsion of an organic vehicle phase having a colorant dispersed therein and an aqueous phase containing a surfactant, the vehicle phase preferably being liquid at 70° C. and solid at 20° C.

15 Claims, No Drawings 5,047,084

MICROEMULSION INK JET INK COMPOSITION

TECHNICAL FIELD

This invention is in the field of printing ink compositions for use in thermal ink jet or bubble-driven ink jet printing processes.

BACKGROUND ART

Ink jet printing is accomplished by ejecting ink from jets toward paper or other medium upon which printing is to be placed. In various printing processes ink is driven from the jets toward the medium in different ways. Among these are electrostatic printing which is performed by driving ink from a jet toward a medium with an electrostatic field.

Another ink jet printing procedure employs a piezoelectric element located within the ink jet. Electrically caused distortions of the piezoelectric element cause it to operate in a pump-like fashion to drive ink through the jet and toward a printing medium. Still another ink jet printing procedure drives ink from the jet and toward the printing medium by forming an expanding vapor-phase bubble near the jet. The vaporizable material that forms the bubble is called the driver. These various printing methods are described in Vaught et al U.S. Pat. No. 4,490,728, *Output Hard Copy Devices*, edited by Durbeck and Sherr, Academic Press 1988, see particularly Chapter 13 entitled INK JET PRINTING, and EPC Application EP 0036790.

Some ink jet inks are liquids at room temperature. Liquid inks do not respond the same to different printing mediums. Typically, liquid ink on office papers will produce a feathered appearance because it penetrates and spreads into the paper following fiber lines. Liquid inks without curable additives may not be useful on non-porous surfaces such as metal, glass or plastic because, being liquid phase at room temperature, they smear. Liquid inks that are designed for minimum feathering require time to set which may limit the rate that printed pages are stacked and liquid inks are very sensitive to temperature changes which influence the ink viscosity and interfacial tension which in turn influences how the ink interacts with the medium.

Ink jet inks that experience thermally induced phase change have also been used. These inks are called solid hot melt or wax inks and are used in printing processes known as coldsetting processes. Cold-setting processes use heat to melt the solid ink within the jet assembly and then the liquid is driven through the jet mechanically, for example by using a piezoelectric element as described above. Conventional cold-setting ink jet inks are not useful in a thermal ink-jet printing process because they consist of low vapor pressure constituents which are not good bubble formers. The bubble former, called a driver, must have critical properties for any given jet configuration in order to initiate jetting by a thermal ink jet device. The high boiling waxy materials from which solid inks are made normally have low critical pressures and poor thermal diffusivity so that they cannot achieve to the high superheat temperatures required for sudden nucleation and explosive bubble formation.

Ink jet inks comprise a vehicle and a coloring element that is called a colorant. The vehicle is the portion of the ink that carries the colorant and it is usually an organic material such as an oil or a wax. The vehicle holds the ink to the medium while the colorant entrained in the vehicle produce the visible image. The term colorant as used in the ink jet ink art is a general term for a material that makes ink intensely colored and therefore visible when it is on the medium. The term colorant includes dyes and pigments.

DISCLOSURE OF THE INVENTION

This invention is an ink jet ink composition that overcomes or greatly mitigates the problems associated with prior ink jet inks. The ink jet ink of this invention is a microemulsion in which one phase is a vehicle that is immiscible with water and has at least twelve carbon atoms per molecule, and the second phase is aqueous. In a preferred embodiment of the invention the vehicle is solid at 20° C. and liquid at 70° C.

Microemulsions are known to the art. A microemulsion has variously been defined as a thermodynamically stable isotropic solution of surfactant, oil, and water. Microemulsions are sometimes referred to as solutions, however, they are not solutions in the classic sense of that word. On a microscopic level microemulsions are two-phase systems in which one of the aqueous phase or the oil phase is continuous while the other phase is discontinuous. There are intermediate regions that are poorly defined that are called bicontinuous systems, however, none of the bicontinuous systems is useful in this invention.

A microemulsion may be translucent or transparent and it has lower viscosity than the mixture from which it is formed. Thus, if oil, water and appropriate surfactants that are useful to form a microeumulsion are mixed together and shaken, a suspension of the discontinuous phase in the continuous phase will form that normally has a relatively high viscosity. Upon the formation of a true microemulsion, usually by applying heat or simply by the passage of time, the suspension will become transparent and it will have a significantly lower viscosity than the cloudy mixture from which it was formed. Microemulsions always have a minimum of three components: oil, water and a suitable surfactant. Microemulsions usually are thermodynamically stable for an indefinite period of time and many will survive freezing and thawing cycles.

The ink jet ink of this invention is a microemulsion wherein either the vehicle phase or the aqueous phase may be the continuous phase. In a preferred embodiment of the invention the aqueous phase is the driver and is discontinuous. In a particularly preferred embodiment the ink consists of from about 35% to about 7% by volume of aqueous phase. In the ink jet ink of this invention the colorant preferably is o soluble and therefore distributed largely, if not entirely, in the vehicle phase. Water soluble colorants may also be used. The vehicle of the ink of this invention is either a waxy material that is solid at room temperature or an organic solution such as mineral oil having at least twelve carbon atoms per molecule. A wax-based ink creates the advantage of solidifying on the medium by phase change rather than by absorption and evaporation of a solvent.

It is thought that the microemulsion structure of the ink of this invention is stabilized by the formation of a cosurfactant which surrounds each droplet of discontinuous phase to prevent the microscopic droplets from coalescing. For example, when stearic acid is the vehicle and triethenolamine is the co-solvent in the aqueous phase, an ion-pair forms an adduct that is cosurfactant. In this example the TEA counter-ion of each ion-pair is associated with the aqueous phase droplet while the stearic acid tail of each molecule is associated with the continuous vehicle phase. Steric hinderance of the adduct surrounding the aqueous droplet protects it from coalescing with other aqueous droplets and stabilizes the microemulsion.

The inks of this invention have many advantages over other bubble driven ink jet inks. One advantage over organic solvent based inks is that the water phase is the driver. Water has a significantly higher critical pressure than any organic solvent and is therefore particularly adapted for bubble driven ink jet printing. Another advantage is that microemulsion inks produce printed dot sizes that are nearly independent of the surface properties of the medium because they can wet either hydrophilic or hydrophobic surfaces. Still another advantage is that microemulsion inks produce printed dots that readily penetrate the paper surface.

Another advantage of the ink of this invention is that the water driver is stable, being resistant to deterioration caused by oxygen, heat or radiation, which is not the case for organic solvent-based drivers. A further advantage of the ink of this invention is that the aqueous driver is effective in very low concentration in that it can function as a driver without also functioning as a solvent. The ability of the aqueous phase to function as a driver without being a solvent makes it compatible with virtually any non-aqueous vehicle.

Another particular advantage of the ink of this invention is that it may be composited with the only volatile component of the composition being water, so the ink may be used in any amount in a room of any size, even without adequate ventilation, without causing a hazardous environment or the uncomfortable effects associated with the presence of organic solvents in the atmosphere.

BEST MODE FOR CARRYING OUT THE INVENTION

A number of solid phase and liquid phase inks embodying this invention were made in accordance with the following procedures. Inks using solid phase vehicles were made by placing a quantity of organic ink vehicle in a vial to which an appropriate amount of a surfactant is added and that mixture is placed in an oven until all ingredients are melted, after which a second vial containing water and a co-solvent is placed in the oven. Both vials remain in the oven until all of the liquid equilibrates to oven temperature. The appropriate quantity of aqueous solution is then added to the vehicle solution and the vial is capped and vigorously shaken until the ingredients are in the form of a viscous emulsion. The container of viscous material is then lightly capped and returned to the oven (usually for 15–20 minutes) after which the material is observed to be transparent and to have a much lower viscosity than the freshly shaken material. This low viscosity, transparent material is a microemulsion. Inks using liquid phase vehicles were made by placing appropriate amounts of two surfactants into a flask. Usually the surfactants were Aerosol OT and SPAN 20. The appropriate amount of liquid phase vehicle was then added to the flask containing the surfactants and after that a premeasured volume of water was slowly added to the flask until the Aerosol OT surfactant was completely dissolved. The flask was then shaken to form an emulsion and permitted to stand until a clear, nonviscous liquid formed. The clear liquid was a microemulsion. The quantities used in all of the following examples were such that water was the discontinuous phase.

An oil soluble colorant is added to the microemulsion in the amount required to obtain the desired color density. In the amounts used the oil-soluble colorants did not influence the stability of the microemulsion. In the following examples the dye is added as the final step in the procedure for making ink in order to make the mixture observable. The dye can be added to the vehicle at any stage of the procedure. Colorants soluble in water or in both water and oil may also be used.

EXAMPLE ONE

An ink was composited using stearic acid as the vehicle phase. Four mL of stearic acid was placed in an 8 mL vial with 2.0 mL polyoxyethylene sorbitan monostearate marketed by International Chemicals, Inc. under the trademark TWEEN-20. In a separate vial, the aqueous phase consisting of 11% triethanolamine in water was placed. The surfactant which was added to the stearic acid constituted approximately 25% by volume of the final mixture.

Sufficient aqueous phase was introduced into the stearic acid phase to constitute 22.5% by volume of the final composition. The mixture was vigorously shaken and heated as noted above. When a microemulsion was formed, as indicated by the low viscosity and transparency of the mixture, 7% by volume of a commercially available black dye marketed as NEPTUNE BLACK x 14 by BASF Wyandotte Corp. under the trademark TYPOPHOR L was added to the clear mixture and thoroughly blended with it. The resultant ink was then cooled to room temperature at which temperature the microemulsion was an opaque solid.

The ink was heated to 85° C. and successfully employed in a bubble-driven ink jet printing process. Although it was a microemulsion the ink demonstrated all of the characteristics of a single-phase system. The printed patterns showed a high degree of medium-independence, medium penetration, rapid set time and ink films that were continuous and homogeneous with no sweating out of the water phase.

EXAMPLE TWO

Another ink composition was made using the technique described above but having the following composition. The ink vehicle was again stearic acid to which 34% by volume of a commercially available surfactant marketed as AEROSOL OT was added. AEROSOL OT is based on bis(2-ethylhexyl) sulfo-succinic acid. The aqueous phase consisted of 2.5% triethanolamine in water. Aqueous phase was added to the vehicle in an amount to constitute 21.5% by volume of the final composition and the composition was shaken and heated as disclosed above to form a microemulsion. When the microemulsion was cooled to room temperature, it solidified and no phase separation was observed. The ink was then remelted and TYPOPHOR L in an amount of approximately 7% by volume of the total composition was then added to the microemulsion to produce an ink. The ink was successfully employed in a bubble-driven ink jet printing process.

EXAMPLE THREE

An ink composition was prepared in the manner set forth above using myristic acid as a vehicle. The vehicle phase consisted of two parts of myristic acid and one part of TWEEN 20 on a volume basis. The aqueous phase consisted of an aqueous solution of 11% triethanolamine. Enough of the aqueous mixture to constitute 25% by volume of the final composition was added to the vehicle phase in accordance with the techniques set forth above to form a microemulsion. The microemulsion was cooled to room temperature whereupon it solidified and, upon standing, a slight amount of phase separation was observed.

When the microemulsion was remelted and mixed with approximately 7% of SUDAN BLUE ×60 dye colorant available from BASF and shaken again, a microemulsion was again formed and that microemulsion was employed successfully in a bubble-driven ink jet printing process.

EXAMPLE FOUR

An ink base composition was prepared in the manner set forth above using DURAWAX C as a vehicle. DURAWAX C is an esterified stearic acid sold under that trademark by ASTOR WAS CORP. The ink base was a transparent, low viscosity liquid having physical properties suitable for an ink jet ink if an oil soluble colorant were added to it.

EXAMPLE FIVE

An ink jet ink using a liquid phase vehicle was made by blending the following ingredients on a weight basis:
seventy parts of BLANDOL, a white mineral oil sold by WITCO eight parts of the surfactant AOT nine parts of the surfactant SPAN 20 thirteen parts of water The above composition was shaken with 5% of its weight of the colorant SUDAN BLUE ×60 dye and allowed to stand until a low viscosity microemulsion formed. The resultant ink was successfully employed in a thermal ink jet printing process.

We claim:

1. A thermal ink jet ink composition comprising:
   a. a vehicle phase that is immiscible with water, having at least twelve carbon atoms per molecule and having a colorant dispersed therein,
   b. an aqueous phase,
   c. a surfactant,
   d. one of said vehicle phase and said aqueous phase being a continuous phase,
   e. the other of said vehicle phase and said aqueous phase being a discontinuous phase,
   f. said continuous phase and discontinuous phase constituting a microemulsion.

2. The composition of claim 1 wherein said aqueous phase is discontinuous.

3. The composition of claim 1 wherein said vehicle phase is liquid at 70° C. and solid at 20° C.

4. The composition of claim 1 wherein said vehicle phase comprises fatty acids having from about 16 to about 30 carbon atoms per molecule.

5. The composition of claim 1 wherein said vehicle phase comprises stearic acid.

6. The composition of claim 1 wherein said vehicle phase comprises myristic acid.

7. The composition of claim 1 wherein said vehicle phase comprises an esterified fatty acid.

8. The composition of claim 1 wherein said vehicle phase comprises white mineral oil.

9. The composition of claim 1 wherein said surfactant comprises polyoxyethylene (20) sorbitan monostearate.

10. The composition of claim 1 including a co-solvent in the aqueous phase that forms a cosurfactant with said vehicle phase.

11. The composition of claim 10 wherein said co-solvent comprises triethanolamine.

12. The composition of claim 1 wherein said surfactant comprises bis(2-ethylhexyl) sulfo-succinic acid.

13. The method for preparing an ink jet ink comprising:
   a. adding a co-solvent to a vehicular phase that is immiscible with water and having at least twelve carbon atoms per molecule,
   b. adding surfactant to water to form an aqueous phase,
   c. adding said aqueous phase to said vehicle phase in an amount to form a two-phase mixture which, when emulsified, will have the aqueous phase as a discontinuous phase,
   d. agitating said two-phase mixture to form an emulsion,
   e. maintaining said emulsion at a temperature higher than the melting temperature of said vehicle phase until a microemulsion is formed, and
   f. adding a colorant to said emulsion.

14. The method of claim 13 wherein the volume of said vehicle phase is greater than the volume of said aqueous phase.

15. The method of claim 14 wherein said aqueous phase constitutes from about 35% to about 7% by volume of said ink jet ink.

* * * * *